(12) United States Patent
Gross (10) Patent No.: US 11,840,342 B2
(45) Date of Patent: Dec. 12, 2023

(54) STORAGE COMPARTMENT ARRANGEMENT FOR A CABIN OF A VEHICLE

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 74 days.

(21) Appl. No.: 17/536,054

(22) Filed: Nov. 28, 2021

(65) Prior Publication Data
US 2022/0153418 A1      May 19, 2022

Related U.S. Application Data (63) Continuation of application No. PCT/EP2021/051596, filed on Jan. 25, 2021.

(30) Foreign Application Priority Data

Jan. 31, 2020    (DE) .................... 10 2020 102 415.0

(51) Int. Cl.
   *B64D 11/00*    (2006.01)
(52) U.S. Cl.
   CPC .................. *B64D 11/003* (2013.01)
(58) Field of Classification Search
   CPC ..... B64D 11/003; B61D 37/003; B60R 5/003; B63B 29/00; B63B 29/02
   See application file for complete search history.

(56) References Cited

U.S. PATENT DOCUMENTS

| 4,383,347 A | 5/1983 | La Conte |
| 2008/0078871 A1 | 4/2008 | Munson et al. |
| (Continued) |

FOREIGN PATENT DOCUMENTS

| DE | 20 2004 009 067 U1 | 8/2004 |
| DE | 10 2004 043910 A1 | 3/2006 |
| (Continued) |

OTHER PUBLICATIONS

German Search Report for Application No. 102020102415 dated Jan. 18, 2021.

(Continued)

*Primary Examiner* — Magdalena Topolski
*Assistant Examiner* — Anna L. Gordon
(74) *Attorney, Agent, or Firm* — KDW Firm PLLC (57) ABSTRACT

A storage compartment arrangement for a vehicle cabin having a storage compartment, housing, closable storage compartment opening, lower compartment section in the housing, and upper compartment section in the housing. The storage compartment opening extends over the structural heights of both compartment sections. Items of luggage can be placed onto a lower horizontal pivoting edge and pushed into the lower compartment section. An upper horizontal pivoting edge is provided onto which items of luggage can be placed and can be pushed into the upper compartment section. The storage compartment opening has an upper opening edge facing an upper side of the upper compartment section and is adjoined by an auxiliary surface extending over the upper compartment section, is at an angle in a range of 10° to 50° to the separating plane, and, as the distance from the upper delimitation increases, encloses an increasing distance from the separating plane.

19 Claims, 3 Drawing Sheets

(56) References Cited

U.S. PATENT DOCUMENTS

| | | | |
|---|---|---|---|
| 2017/0334562 A1* | 11/2017 | Long | E05B 53/00 |
| 2017/0355463 A1* | 12/2017 | Simms | B61D 37/003 |
| 2018/0215467 A1* | 8/2018 | Sankrithi | B64D 11/003 |
| 2018/0362164 A1 | 12/2018 | Metten | |
| 2019/0023401 A1* | 1/2019 | Savian | B64D 11/0606 |
| 2019/0254422 A1 | 8/2019 | Beere | |

FOREIGN PATENT DOCUMENTS

| | | | | |
|---|---|---|---|---|
| DE | 10 2013 021 108 A1 | 6/2015 | | |
| DE | 102013021449 A1 * | 6/2015 | | B64D 11/00 |
| EP | 0614806 A1 | 9/1994 | | |
| WO | WO-2017137208 A1 * | 8/2017 | | B61D 37/00 |

OTHER PUBLICATIONS

International Search Report for Application No. PCT/EP2021/051596 dated Apr. 15, 2021.

German Search Report for Application No. 102020102439 dated Jan. 20, 2021.

* cited by examiner

STORAGE COMPARTMENT ARRANGEMENT FOR A CABIN OF A VEHICLE

CROSS-REFERENCE TO RELATED APPLICATIONS

This application is a continuation of and claims priority to Application No. PCT/EP2021/051596 filed Jan. 25, 2021, which claims priority to German Patent Application No. DE 10 2020 102 415.0 filed Jan. 31, 2020, the entire disclosures of which are incorporated by reference herein.

TECHNICAL FIELD

The disclosure herein relates to a storage compartment arrangement for a cabin of a vehicle, and to a vehicle having a passenger cabin and having at least one such storage compartment arrangement.

BACKGROUND

The fitting out of passenger cabins of aircraft is conventionally selected so as to make particularly efficient use of the space and at the same time to provide a high level of comfort. The need for storage space for hand luggage can vary depending on the travel distance to be covered by the aircraft. However, there is a trend for increasing hand luggage, in particular for short haul journeys. For this purpose, overhead storage compartments are known which have an enlarged volume and an enlarged storage compartment opening such that more luggage can be introduced into individual storage compartments.

SUMMARY

The result of simply enlarging storage compartments may be that luggage is accommodated relatively arbitrarily in storage compartments and in particular larger items of hand luggage from a certain amount of filling no longer fit into the storage compartments and therefore have to be pushed under passenger seats or require the rearrangement of items of luggage in the storage compartment.

It is the object of the disclosure herein to propose an alternative storage compartment arrangement which has a greater storage capacity, in particular for larger items of hand luggage, is nevertheless easily accessible and can be used even in more compact cabins.

The object is achieved by a storage compartment arrangement disclosed herein. Advantageous embodiments and refinements are disclosed herein.

A storage compartment arrangement for a cabin of a vehicle is disclosed, having at least one storage compartment with a housing, a closable storage compartment opening, a lower compartment section formed in the housing, and an upper compartment section formed in the housing, wherein the lower compartment section and the upper compartment section are arranged directly one above the other, wherein the storage compartment opening extends at least over the structural heights of both compartment sections, wherein, at a lower delimitation of the lower compartment section directed toward the storage compartment opening, a lower horizontal pivoting edge is formed, onto which items of luggage can be placed and can be pushed into the lower compartment section, wherein, adjacent to an imaginary horizontal separating plane between the compartment sections, an upper horizontal pivoting edge is formed, onto which items of luggage can be placed and can be pushed into the upper compartment section, and wherein the storage compartment opening has an upper opening edge which faces an upper side of the upper compartment section and is adjoined by an auxiliary surface which extends over the upper compartment section, is at an angle in a range of 10° to 50° with respect to the separating plane and, as the distance from the upper opening edge increases, encloses an increasing distance from the separating plane.

The at least one storage compartment has a housing which predetermines the outer form of the storage compartment. The lower compartment section and the upper compartment section are realized in the housing. They lie directly one above the other and are characterized by the features depicted further below. It is conceivable for the lower compartment section and the upper compartment section to be designed to accommodate largely standardized or at least recommended items of luggage, for example in accordance with IATA recommendations. Other dimensions on the basis of increased dimensions of items of luggage are also conceivable.

The storage compartment opening permits luggage to be moved into or out of the storage compartment. It is expedient to design the storage compartment opening to be closable such that, during the use of the vehicle, the luggage located in the storage compartment remains safely stored and does not inadvertently drop into the cabin. For convenient introduction or removal of items of luggage, the two compartment sections can preferably be opened completely. This can be undertaken selectively or together.

The lower horizontal pivoting edge could be designed as a delimitation edge of the lower compartment section. It can end with a lower compartment base, but also somewhat above the base, for example a few millimeters to up to 1 or 2 cm thereabove, in order to form a type of edge. Items of luggage can be secured by the edge against sliding out. This is in particular of advantage if a compartment base has a slight inclination. Furthermore, the rigidity of the housing of the storage compartment is thereby improved. An item of luggage, for example a carry-on suitcase trolley, can be placed onto the lower pivoting edge in order subsequently to be pushed over it so as to slide into the lower compartment section. A user can consequently stand, for example, in an aisle in the cabin next to passenger seats, can lift up their item of luggage and place it onto the lower pivoting edge in order then by further pushing to push the item of luggage completely into the lower compartment section. The lower pivoting edge here facilitates the handling since, even at the beginning of introducing the item of luggage, some of the weight is absorbed by the storage compartment and the user has to make less effort.

Similarly thereto, an upper pivoting edge is provided for the upper compartment section. The pivoting edge is located adjacent to an imaginary separating plane between the two compartment sections. The separating plane here should be understood as meaning an area which extends between the two compartment sections and is an imaginary division of the at least one storage compartment. The separating plane can preferably be oriented parallel to a cabin floor, when the storage compartment arrangement is located in a cabin, or it could enclose an angle of up to 5° with respect thereto. The upper pivoting edge can lie directly in the separating plane, but can also merely touch the separating plane or lie a few millimeters up to 1 or 2 cm above the separating plane. The aim with the upper pivoting edge is to permit a user to support an item of luggage on the upper pivoting edge and, by pushing the item of luggage along the upper pivoting edge, to bring the item of luggage into the upper compartment section.

It is conceivable here that, during use of the vehicle, the compartment sections are basically filled successively, with first of all the lower compartment section and then the upper compartment section being filled with items of luggage. Items of luggage which are located in the upper compartment section consequently then largely lie on items of luggage which are in the lower compartment section. It is furthermore conceivable for the items of luggage in the upper compartment section also to rest on the upper pivoting edge. The latter can preferably be spaced apart from the storage compartment opening in the horizontal direction.

By this configuration, a particularly space-saving arrangement of storage compartments with at the same time a high luggage capacity can be realized, the storage compartments also being able to be integrated in means of transport having smaller fuselage dimensions. The cabin of the vehicle can consequently have higher capacities for accommodating hand luggage. However, a possibly higher access opening for items of luggage in the upper compartment section may therefore be the result. A user would then have to possibly lift an item of luggage somewhat higher in order to bring it into the upper compartment section. The upper pivoting edge can, however, act here as assistance over a substantial portion of the process of introducing the item of luggage and can reduce the effort required by the user.

In order to be able to push the item of luggage more simply and more specifically into the upper compartment section, the abovementioned auxiliary surface is provided. The latter is located above the upper compartment section in the vertical direction and encloses the abovementioned angle with the separating plane. As soon as the item of luggage protrudes a few centimeters into the upper compartment section and rests on the upper pivoting edge, an upper surface of the item of luggage is located between the upper pivoting edge and the auxiliary surface in surface contact with the auxiliary surface. The center of gravity of the item of luggage here lies outside the storage compartment. The position of the center of gravity causes a torque to act on the item of luggage about the upper pivoting edge in the direction of the auxiliary surface such that, consequently, the upper surface of the item of luggage is pressed onto the auxiliary surface by the dead weight of the item of luggage. Consequently, the auxiliary surface assists the absorbing of the weight and acts at the same time as a guide of the upper surface for pushing the item of luggage into the upper compartment section.

The guide can be optimized to such an extent that a distance between the upper pivoting edge and the auxiliary surface is adapted to preferred items of luggage, for example carry-on suitcase trolleys. The angle enclosed between the separating plane and the auxiliary surface is furthermore preferably selected in such a manner that an average user placing the item of luggage onto the upper pivoting edge subsequently holds the item of luggage at such an angle with respect to the cabin floor that the space enclosed between the upper pivoting edge and the auxiliary surface permits the item of luggage to be pushed in. The angle can be approximately 10° to 50°, preferably 10° to 30° and particularly preferably 15° to 25°. The precise selection of the angle can be dependent on the distance of the upper horizontal pivoting edge from the floor and/or from the aisle.

All in all, the storage compartment arrangement according to the disclosure herein permits a particularly advantageous combination of compartments lying one above another in a space-saving manner without restricting the sense of comfort in the cabin.

It is particularly preferred if no partition is arranged between the lower compartment section and the upper compartment section. By saving on a partition, it is possible to save not only on weight, but also on construction volume. The two compartment sections are consequently not separated from each other physically, but rather merge into each other in the interior of the storage compartment. Only the upper horizontal pivoting edge is arranged in the separating plane or somewhat thereabove and could constitute a type of division that causes a user to introduce their item of luggage either below or above the upper pivoting edge. In this embodiment, as depicted above, a successive filling of the lower compartment section and of the upper compartment section is expedient.

In an advantageous embodiment, the upper horizontal pivoting edge is formed by an elongate, rigid element which extends parallel to the upper opening edge. In a preferred embodiment, this element could be a rod or a tube which has a hollow cross section. The cross section could be, for example, circular, and therefore the effective cross section for absorbing loads from an item of luggage does not change even when the element is rotated. Of course, other elements which can be designed, for example, as more complex solid profiles or hollow profiles are also possible. Since the element is subjected to a particularly heavy loading during regular use of the upper compartment section, the element can be formed particularly preferably from a metallic material or can have a casing made of a metallic material.

It is particularly preferred if the element which forms the upper horizontal pivoting edge is removable. Significantly larger items of luggage can therefore be accommodated.

The lower compartment section and the upper compartment section could be offset horizontally with respect to each other at least in the region of the storage compartment opening. The horizontal offset permits an arrangement of the upper compartment section in a region of a fuselage cross section that extends to a pronounced extent in the horizontal direction. This can be for example an upper part of the fuselage cross section that lies directly below the ceiling region (what is referred to as the crown area of a fuselage cross section). In order to provide a sufficient depth of the upper compartment section for an item of luggage having a predetermined thickness, a front end of the upper compartment section should consequently be offset in the horizontal direction somewhat further toward the cabin.

It is advantageous if the upper horizontal pivoting edge is spaced apart in the horizontal direction from the lower horizontal pivoting edge and the upper opening edge. The upper horizontal pivoting edge consequently lies horizontally in a region between the lower horizontal pivoting edge and the upper opening edge. An item of luggage which is inserted into the upper compartment section can consequently rest on the upper horizontal pivoting edge even when the storage compartment is closed. The item of luggage is then supported by the item of luggage in the lower compartment section and the upper horizontal pivoting edge.

In a particularly advantageous embodiment, the lower compartment section and the upper compartment section are each designed to accommodate a plurality of items of hand luggage having IATA standard maximum dimensions next to one another. The items of hand luggage can have approximately dimensions of 55×40×20 cm. Taking into consideration wheels, handles and the like, dimensions of approximately 56×40×25 cm can be assumed, wherein the latter dimension could also be exceeded somewhat. Approximately surrounding dimensions of 610 mm×406 mm×254 mm or slightly deviating dimensions could be appropriate. In the configuration of the two compartment sections on such a basis, 90% or more of the customary items of hand luggage can consequently be accommodated. By close adaptation to the dimensions, the compartment sections can bring a user intuitively to arrange items of luggage next to one another in the same orientation such that as large an amount of items of hand luggage as possible can be accommodated.

The lower compartment section preferably has a base which is at a distance of at most 35 cm and preferably at most 30 cm from the separating plane. By delimitation of the height of the lower compartment section, a user can push in the item of hand luggage only in an orientation provided for this purpose. The upper pivoting edge serves here as a type of delimitation such that pushing in of the item of luggage upright is prevented. A distance of up to 35 cm or preferably of up to 30 cm permits the pushing in of an item of hand luggage having a thickness of, for example, up to 25 or 26 cm and could even allow the depositing of a jacket or the like thereon.

It is advantageous if an auxiliary plane spanned by the auxiliary surface is at a distance in a range from 20 to 45 cm and preferably 25 to 35 cm from the upper pivoting edge. The distance of the auxiliary plane is then adapted to the abovementioned recommended thickness of an item of hand luggage and permits the item of hand luggage to easily be pushed into the upper compartment section. At the same time, however, the above-explained assisting of the item of luggage by the auxiliary surface is promoted.

In a further preferred embodiment, the storage compartment opening is closable by an upper storage compartment flap and a lower storage compartment flap, wherein the lower storage compartment flap is assigned to the lower compartment section and the upper storage compartment flap is assigned to the upper compartment section. The two storage compartment flaps could be opened in opposite directions. The upper storage compartment flap could be arranged approximately at an upper end of the upper compartment section and could be opened by pivoting upward. The lower storage compartment flap could be mounted pivotably at a lower end of the lower compartment section and could be pivoted open downward. By opening of both storage compartment flaps, the entire storage compartment is consequently opened, and therefore items of luggage can be conveyed into the compartment sections or out of the compartment sections. It could be expedient to lock the upper storage compartment flap to the lower storage compartment flap, or vice versa. The two storage compartment flaps then form a cohesive closure with only a single fitting, and therefore the weight thereby reached is as low as possible.

Particularly preferably, the storage compartment arrangement furthermore has at least one passenger service unit or a service duct on a lower side of the housing. The storage compartment arrangement is therefore suitable for arranging directly above passenger seats. A service duct could accommodate a plurality of passenger service units and could accommodate same, for example, to be displaceable or fastenable at least to an adjustable position. The passenger service units then provide in particular the customary functions, such as reading light, air vent, and the provision of a display unit and of oxygen masks.

It is advantageous if the passenger service unit or the service duct merges steplessly and with a continuous curvature into a form of the housing. Therefore, not only can the visual form be configured attractively, but also possible impact edges can be prevented. If the lower end of the storage compartment arrangement is placed somewhat lower than in the case of conventional, smaller storage compartments, this is particularly advantageous.

The disclosure herein furthermore relates to a vehicle having a cabin, a floor, passenger seats located on the floor, and at least one storage compartment arrangement according to the preceding statements arranged above the passenger seats. This can be a cabin with a central aisle which separates from each other two passenger seat sections each having three passenger seats located next to one another. As an alternative thereto, the cabin can also have two aisles which are spaced apart from each other and run parallel to each other and separate three passenger seat sections from one another. These could then in particular have two lateral, outer passenger seat sections and a central passenger seat section. A storage compartment arrangement could be provided above an outer and/or above a central passenger seat section.

It is preferred if the lower horizontal pivoting edge is at a vertical distance in a range of 150-170 cm from the floor. Therefore, for example, passenger cabins can be fitted with the storage compartment arrangement according to the disclosure herein which, in a vehicle, in particular in an aircraft, has a fuselage diameter of at most 6 m, preferably of at most 5 m and particularly preferably of at most 4 m. The vertical distance permits the easy introduction of items of luggage into the lower compartment section and does not restrict the sense of comfort of passengers directly below the storage compartment arrangement.

It can also be advantageous if the upper horizontal pivoting edge is at a vertical distance in a range of 175-195 cm. Items of luggage can thereby also be introduced relatively simply into the upper compartment section.

Finally, the auxiliary surface can enclose an angle in a range of 15° to 25° with respect to the separating plane. In particular, at the abovementioned vertical distances, the auxiliary surface could support the item of luggage for the upper compartment section.

BRIEF DESCRIPTION OF THE DRAWINGS

Further features, advantages and possible uses of the disclosure herein emerge from the following description of the example embodiments and from the figures. Here, all of the features described and/or illustrated in the figures form the subject matter of the disclosure herein individually and in any desired combination, even independently of the combination of the features in the individual claims or the back-references thereof. Furthermore, in the figures, the same reference signs are used for identical or similar objects.

DETAILED DESCRIPTION

Figure 1:
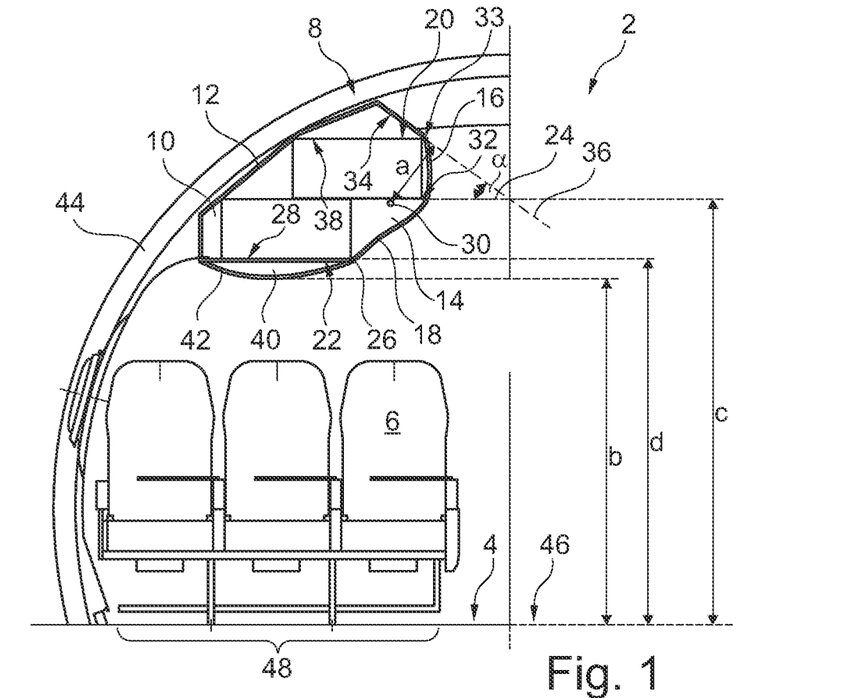
FIG. 1 shows a cabin with a storage compartment arrangement above passenger seats in a partial cross-sectional view.

FIG. 1 shows a passenger cabin 2 of a commercial aircraft with a floor 4, passenger seats 6 located thereon and a storage compartment arrangement 8 positioned thereabove. The storage compartment arrangement 8 has at least one storage compartment 10 which has a housing 12. The housing could extend, for example, over a length of four former sections of the aircraft. This could correspond, for example, to three rows of seats with a relatively narrow seat spacing. The housing 12 could completely surround the storage compartment 10 or could at least be open at least rearward. The storage compartment 10 has a storage compartment opening 14 which is closable by an upper storage compartment flap 16 and a lower storage compartment flap 18. Furthermore, an upper compartment section 20 and a lower compartment section 22 are formed in the storage compartment 10. The two compartment sections 20 and 22 lie directly one above the other and are not divided by a physical element. Between them there is a separating plane 24 which is illustrated by dashed lines and is merely an imaginary plane. The plane runs in particular parallel to the floor 4, and therefore the upper delimitation of the lower compartment section 22 and the lower delimitation of the upper compartment section 20 run parallel to the floor 4. The storage compartment opening 14 extends at least over the structural heights of the two compartment sections 20 and 22 such that items of luggage can be introduced freely into the compartment sections 20 and 22.

To assist the insertion of an item of luggage into the lower compartment section 22, a lower horizontal pivoting edge 26 is provided. The latter terminates by way of example with a lower front edge of the lower compartment section 22. A user can place an item of luggage onto the lower pivoting edge 26 in order then to push the item of luggage along the lower pivoting edge 26 into the lower compartment section 22. The item of luggage is always supported by the lower pivoting edge 26 over the pushing distance.

The lower compartment section 22 has a compartment base 28 on which the item of luggage rests after being pushed in. The lower compartment section 22 is dimensioned by way of example in such a manner that an item of luggage having dimensions according to IATA recommendations can be accommodated. The item of luggage has, for example, a length of approximately 55 cm, a width of approximately 40 cm and a thickness of approximately 20-25 cm. In the example shown, the item of luggage can be pushed in flat and in the longitudinal direction, i.e. with a base of a lying item of luggage first. The depth of the lower compartment section 22, which can be seen in the plane of the drawing of FIG. 1, is therefore somewhat more than 55 cm on an upper side of the lower compartment section 22. This is measured at a height of for example 5 cm more than the thickness of the item of luggage, i.e. approximately 25-30 cm above the compartment base 28.

The upper compartment section 20 likewise has a depth of somewhat more than 55 cm at a height of 25-30 cm above the separating plane 24, and therefore an item of hand luggage with the recommended dimensions can likewise be introduced. In order to simplify the pushing in, an upper horizontal pivoting edge 30 is provided which lies in the horizontal direction between the lower horizontal pivoting edge 26 and the lower front edge 32 of the upper compartment section 20. A user can place an item of luggage onto the upper horizontal pivoting edge 30 and can push it along the upper horizontal pivoting edge 30 into the upper compartment section 20.

A particular feature resides in an auxiliary surface 34 which extends over the upper compartment section 20 from an upper opening edge 33 and encloses an angle in a range of 10° to 50° with respect to the separating plane 24. The auxiliary surface 34 furthermore, as the horizontal distance from the upper delimitation of the upper compartment section 20 into the storage compartment interior increases, encloses an increasing distance from the separating plane 24. The distance a of the auxiliary surface 34 from the upper pivoting edge 30, as measured vertically with respect to an auxiliary plane 36, could substantially correspond to the height of the lower compartment section 22. An item of luggage which is inserted by a user between the upper horizontal pivoting edge 30 and the auxiliary surface 34 into the upper compartment section 20 consequently rests on the upper pivoting edge 30, with the upper side of the item of luggage being pressed against the auxiliary surface 34 because of gravity. The arrangement consequently assists the user in using the hands to firmly hold the item of luggage, and therefore the handling is significantly simplified.

A rear wall 38 is connected rearwardly, running between the auxiliary surface 34 and a laterally outer end of the compartment base 28. Connected below the compartment base 28 is a passenger service unit 40 which is surrounded by a paneling 42 which has a continuous curvature.

By way of example, the cabin 2 is formed in an aircraft fuselage 44 which has a diameter of approximately 4 m. The floor 4 lies somewhat below a center point of the fuselage cross section. For example, the clear distance b between the PSU 40 and the floor 4 can be approximately 150 cm. The lower pivoting edge 26 could be located at a distance a of 150 to 170 cm above the floor 4 and approximately 160 cm in the example shown. The upper pivoting edge 30 could be arranged at a distance c of approximately 185 cm above the floor 4.

Owing to the significant curvature of the fuselage 44 on the rear side of the storage compartment 10, in order to provide a sufficient depth of the upper compartment section 20, a horizontal offset is provided between the front edge 32 of the upper compartment section 20 and the lower pivoting edge 26. The offset could lie in a range between 25 and 35 cm in the example shown.

It should be pointed out at this juncture that the cabin 2 has a central aisle 46 which is adjoined on both sides by respective passenger seat sections 48 which are fitted with rows of seats of up to three passenger seats 6 in each case. On both sides of the central aisle 46, storage compartments 10 arranged in a row next to one another in the longitudinal direction of the cabin can be located above the passenger seats 6. In this example, the space above the central aisle 46 remains free.

If the storage compartment 10 extends, for example, over three former sections, it can accommodate five items of luggage having the abovementioned dimensions in each compartment section, such that the storage compartment 10 has an accommodating capacity for ten such items of luggage which are arranged next to one another and transversely with respect to the extent of the aisle.

Figure 2:
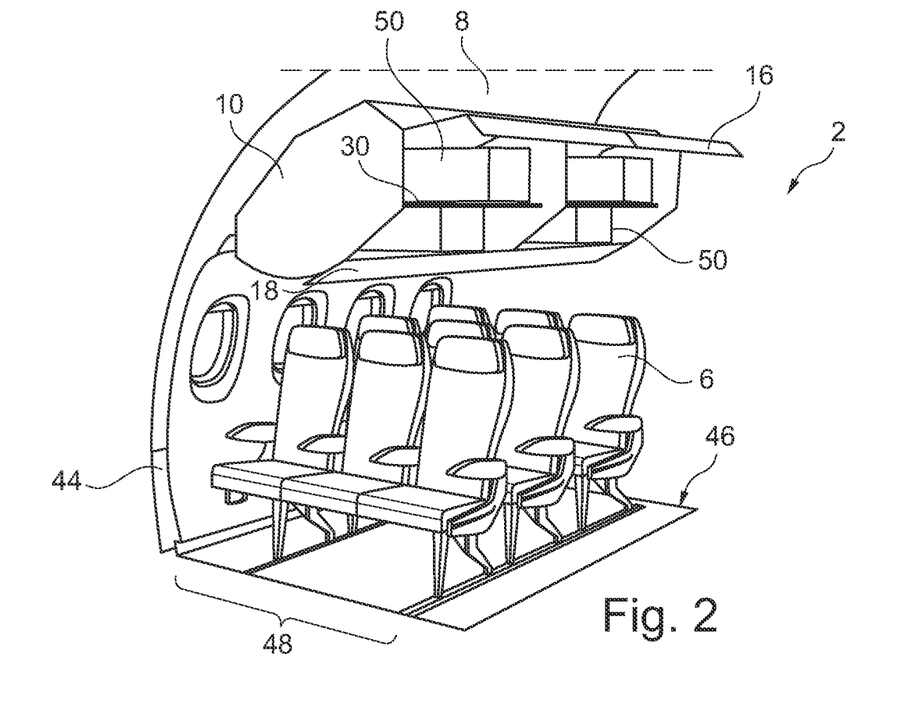
FIG. 2 shows a three-dimensional view of the cabin from FIG. 1 with an open storage compartment.

FIG. 2 furthermore shows the design from a somewhat changed perspective, with the storage compartment flaps 16 and 18 being open. It is seen here that items of luggage 50 are arranged in the compartment sections 20 and 22, wherein the items of luggage 50 lying in the upper compartment section 20 rest on the items of luggage 50 in the lower compartment section 22 and on the upper pivoting edge 30. The items of luggage 50 lie flat here in the particular compartment section 20 or 22 and their longitudinal axis extends into the compartment sections 20 and 22 transversely with respect to the center aisle 46.

The storage compartment flaps 16 and 18 can each be pivoted in the direction of the separating plane 24. They can lock to one another there, for example by a fitting, not shown specifically here. This means that the upper storage compartment flap 16 is locked to the lower storage compartment flap 18, or vice versa.

Figure 3:
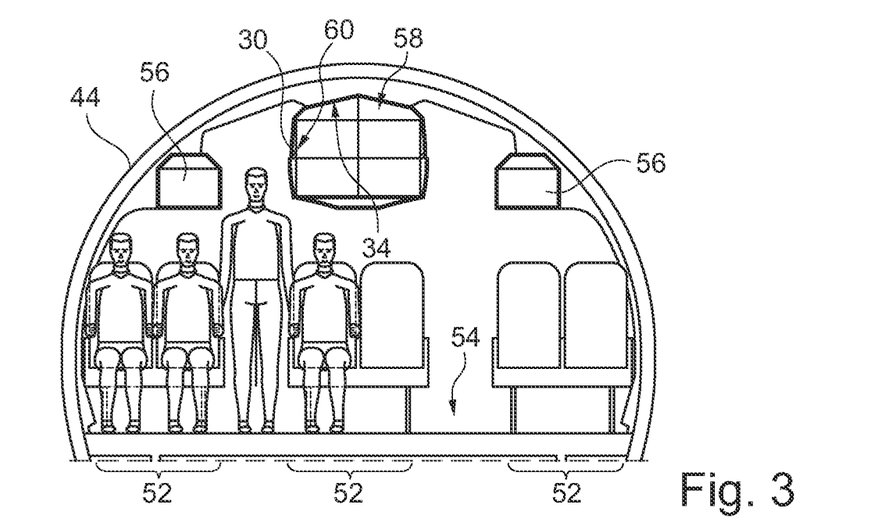
FIGS. 3 and 4 show modifications with a modified storage compartment arrangement in a different cabin layout.

FIG. 3 shows a modification in which three passenger seat sections 52 are provided which are separated from one another by two aisles 54. Each passenger seat section 52 has rows of two passenger seats 2 each. Arranged above the laterally arranged outer passenger seat sections 52 are small storage compartments 56 which can accommodate items of hand luggage which can be introduced in the longitudinal direction of the aisles 54. The small storage compartments 56 are rigid.

Arranged above the middle passenger seat section 52 is a storage compartment arrangement 58 which is designed similarly to the storage compartment arrangement 8 from FIGS. 1 and 2. However, the compartment sections 20 and 22 arranged one above the other are not offset in the horizontal direction, and the upper pivoting edge 30 is arranged on an outer edge 60 of the upper compartment section 20. The auxiliary surface 34 furthermore extends over a greater depth over the upper compartment section 20.

Figure 4:
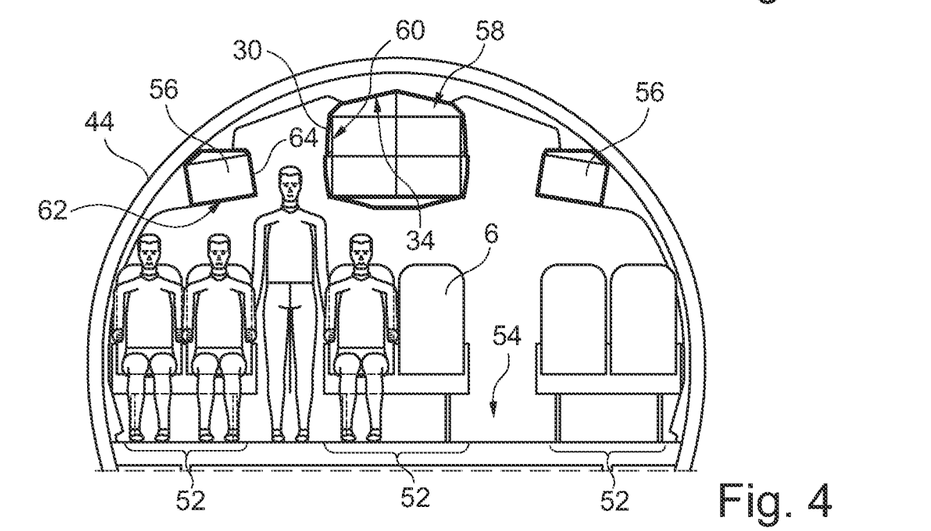

In FIG. 4, the variant from FIG. 3 is modified somewhat further to the extent that the small storage compartments 56 have an upwardly pivotable base 62 which permits a greater distance from the passenger seats 6. In the filled state, the small storage compartments 56 can be compacted by slightly pivoting upward in order then to close the storage compartment flap 64. The latter could then lock the position of the small storage compartments 56.

Figure 5:
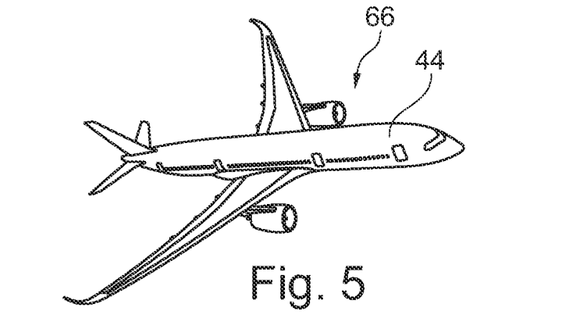
FIG. 5 shows an aircraft.

FIG. 5 shows an aircraft 66 which has the fuselage 44 in which the cabin 2 is arranged. The latter can have a storage compartment arrangement from the preceding figures.

Figure 6A:
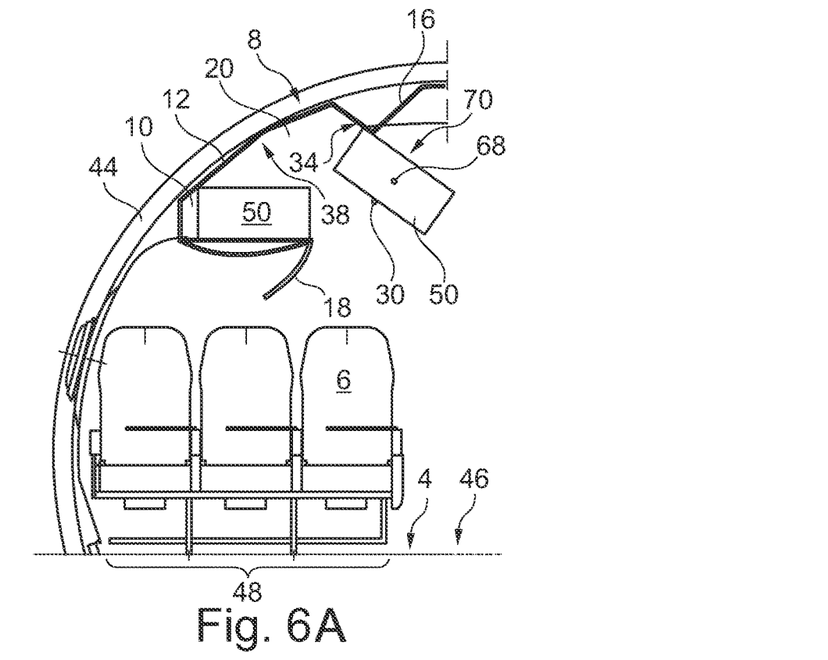
FIGS. 6A and 6B show the process of introducing an item of luggage into the upper compartment section.
Figure 6B:
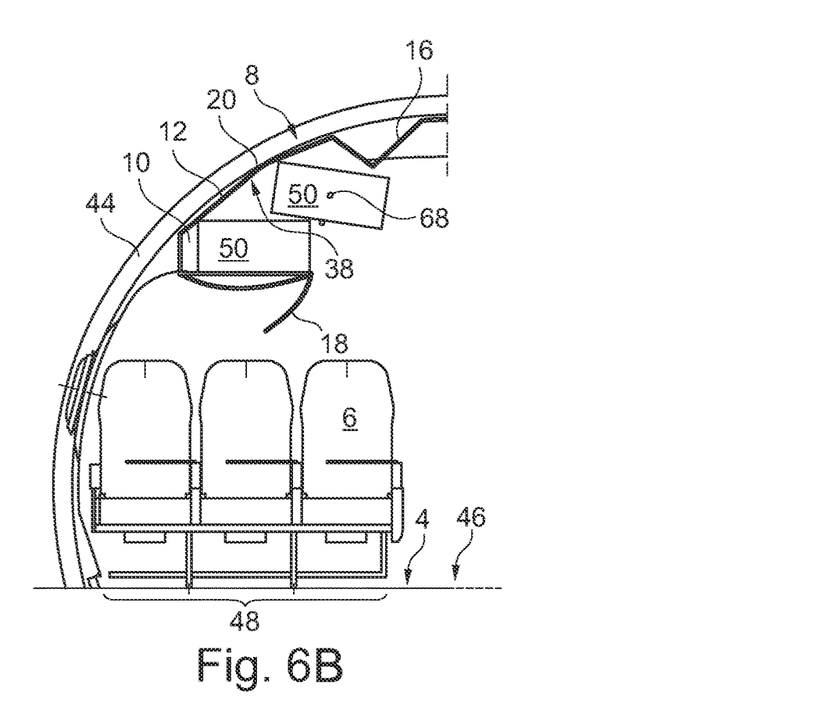

FIGS. 6A and 6B show the process of inserting an item of luggage 50 into the upper compartment section 20. For this purpose, the center of gravity 68 of the item of luggage 50 is illustrated. In FIG. 6A, the center of gravity 68 is located in the horizontal direction outside the upper pivoting edge 30 such that the item of luggage 50 experiences a torque about the upper pivoting edge 30 because of gravity. By this, an upper side 70 of the item of luggage 50 is pressed against the auxiliary surface 34. The item of luggage 50 is thereby held and guided between the upper pivoting edge 32 and the auxiliary surface 34. By further pushing the item of luggage 50 in the direction of the upper storage compartment 20, the center of gravity 68 passes over the upper pivoting edge 30 and further into the upper compartment section 20 such that the item of luggage 50 carries out a pivoting movement in the direction of the separating plane 24. By further pushing, the item of luggage 50 moves sliding on an item of luggage 50 lying therebeneath in the lower compartment section 22 in the direction of the rear wall 38.

It is additionally pointed out that "having" does not rule out other elements or steps, and "a" or "an" does not rule out a multiplicity. It is also pointed out that features that have been described with reference to one of the above example embodiments may also be used in combination with other features of other example embodiments described above. Reference signs in the claims are not to be regarded as limiting.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Passenger cabin
4 Floor
6 Passenger seat
8 Storage compartment arrangement
10 Storage compartment
12 Housing
14 Storage compartment opening
16 Upper storage compartment flap
18 Lower storage compartment flap
20 Upper compartment section
22 Lower compartment section
24 Separating plane
26 Lower horizontal pivoting edge
28 Compartment base
30 Upper horizontal pivoting edge
32 Lower front edge
33 Upper opening edge
34 Auxiliary surface
36 Auxiliary plane
38 Rear wall
40 Passenger service unit
42 Paneling
44 Aircraft fuselage
46 Central aisle
48 Passenger seat section
50 Item of luggage
52 Passenger seat section
54 Aisle
56 Small storage compartment
58 Storage compartment arrangement
60 Outer edge
62 Pivotable base
64 Storage compartment flap
66 Aircraft
68 Center of gravity
70 Upper side of the item of luggage
α Angle of auxiliary surface
a Distance of upper pivoting edge/auxiliary surface
b Height of passenger service unit
c Distance of upper pivoting edge/floor
d Distance of lower pivoting edge/floor

The invention claimed is:
1. A storage compartment arrangement for a cabin of a vehicle, the storage compartment arrangement comprising:
   at least one storage compartment comprising:
      a housing;
      a lower compartment section formed in the housing;
      an upper compartment section formed in the housing, directly above the lower compartment section;
      a closable storage compartment opening that extends at least over structural heights of both the lower compartment section and the upper compartment section;
      at a lower delimitation of the lower compartment section directed toward the closable storage compartment opening, a lower horizontal pivoting edge onto which items of luggage can be placed and can be pushed into the lower compartment section; and adjacent to an imaginary horizontal separating plane between the lower compartment section and the upper compartment section, an upper horizontal pivoting edge onto which items of luggage can be placed and can be pushed into the upper compartment section;

wherein the closable storage compartment opening comprises an upper opening edge, which:

faces an upper side of the upper compartment section;

is adjoined by an auxiliary surface which extends over the upper compartment section;

is at an angle in a range of 10° to 50° with respect to the imaginary horizontal separating plane; and as a distance from the upper opening edge increases, encloses an increasing distance from the imaginary horizontal separating plane; and wherein the housing is devoid of a partition between the lower compartment section and the upper compartment section.

2. The storage compartment arrangement of claim 1, wherein the upper horizontal pivoting edge is formed by an elongate, rigid element which extends parallel to the upper opening edge.

3. The storage compartment arrangement of claim 1, wherein the lower compartment section and the upper compartment section are offset horizontally with respect to each other at least in a region of the closable storage compartment opening.

4. The storage compartment arrangement of claim 1, wherein the upper horizontal pivoting edge is spaced apart in a horizontal direction from the lower horizontal pivoting edge and the upper opening edge.

5. The storage compartment arrangement of claim 1, wherein the lower compartment section and the upper compartment section are each configured to accommodate a plurality of items of hand luggage next to one another.

6. The storage compartment arrangement of claim 5, wherein the plurality of items of hand luggage each have a maximum dimension of 610 mm×406 mm×254 mm.

7. The storage compartment arrangement of claim 5, wherein the plurality of items of hand luggage each have a maximum dimension of 56 cm×40 cm×25 cm, including wheels and handles.

8. The storage compartment arrangement of claim 5, wherein the plurality of items of hand luggage each have a maximum dimension of 55 cm×40 cm×20 cm.

9. The storage compartment arrangement of claim 1, wherein the lower compartment section has a compartment base which is at a distance of at most 35 cm from the imaginary horizontal separating plane.

10. The storage compartment arrangement of claim 1, wherein an auxiliary plane spanned by the auxiliary surface is at a distance in a range from 20 to 45 cm from the upper horizontal pivoting edge.

11. The storage compartment arrangement of claim 1, wherein the closable storage compartment opening is closable by an upper storage compartment flap and a lower storage compartment flap; and wherein the lower storage compartment flap is assigned to the lower compartment section and the upper storage compartment flap is assigned to the upper compartment section.

12. The storage compartment arrangement of claim 1, comprising at least one passenger service unit or a service duct on a lower side of the housing.

13. The storage compartment arrangement of claim 12, wherein the at least one passenger service unit or the service duct merges steplessly and with a continuous curvature into a form of the housing.

14. A vehicle having a cabin, a floor, passenger seats located on the floor, and at least one storage compartment arrangement of claim 1 arranged above the passenger seats.

15. The vehicle of claim 14, wherein the lower horizontal pivoting edge is at a vertical distance in a range of 150-170 cm from the floor.

16. The vehicle of claim 14, wherein the upper horizontal pivoting edge is at a vertical distance in a range of 175-195 cm from the floor.

17. The vehicle of claim 14, wherein the auxiliary surface encloses an angle in a range of 15° to 25° with respect to the imaginary horizontal separating plane.

18. The storage compartment arrangement of claim 1, wherein the lower compartment section has a compartment base which is at a distance of at most 30 cm from the imaginary horizontal separating plane.

19. The storage compartment arrangement of claim 1, wherein an auxiliary plane spanned by the auxiliary surface is at a distance in a range from 25 to 35 cm from the upper horizontal pivoting edge.

* * * * *